United States Patent [19]

Head

[11] 4,317,178

[45] Feb. 23, 1982

[54] MULTIPLE VELOCITY TRAVERSE FLOW RATE MEASURING TECHNIQUE

[75] Inventor: Victor P. Head, Hatboro, Pa.

[73] Assignee: Fischer & Porter Company, Warminster, Pa.

[21] Appl. No.: 16,486

[22] Filed: Mar. 1, 1979

[51] Int. Cl.$^3$ .............................................. G01F 1/00
[52] U.S. Cl. ..................................... 364/510; 73/861; 73/861.31; 364/581
[58] Field of Search .......................... 364/510, 509, 581; 73/194 R, 194 A, 194 C, 194 M, 194 VS, 861, 861.08, 861.18, 861.31; 235/92 FL

[56] References Cited

U.S. PATENT DOCUMENTS

| | | | |
|---|---|---|---|
| 3,498,290 | 3/1970 | Shaw et al. ........................ | 73/194 A |
| 3,564,912 | 2/1971 | Malone et al. ..................... | 73/194 A |
| 3,851,157 | 11/1974 | Ellis ...................................... | 364/581 |
| 3,940,985 | 3/1976 | Wyler ................................ | 73/194 A |
| 4,102,186 | 7/1978 | Brown ............................... | 73/194 A |
| 4,109,523 | 8/1978 | Teyssandier ...................... | 73/194 A |

Primary Examiner—Errol A. Krass
Attorney, Agent, or Firm—Michael Ebert

[57] ABSTRACT

A method and systems based thereon for conducting a multiple velocity traverse of a flow stream cross section of known shape and area to determine flow therethrough. The technique employs any one of the known methods of numeral integration to place the traverse chords and weight the chord average velocities, the technique being applicable to flow streams of any known cross-sectional shape and area without requiring that the chords be parallel.

11 Claims, 8 Drawing Figures

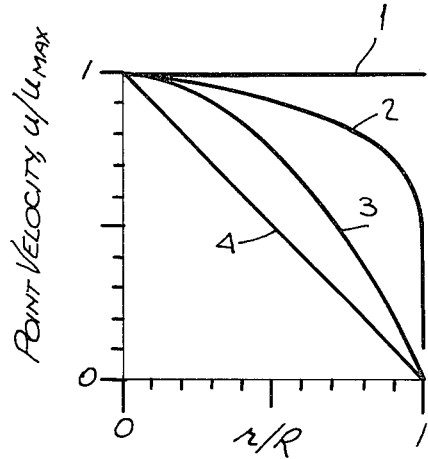
Fig. 1.
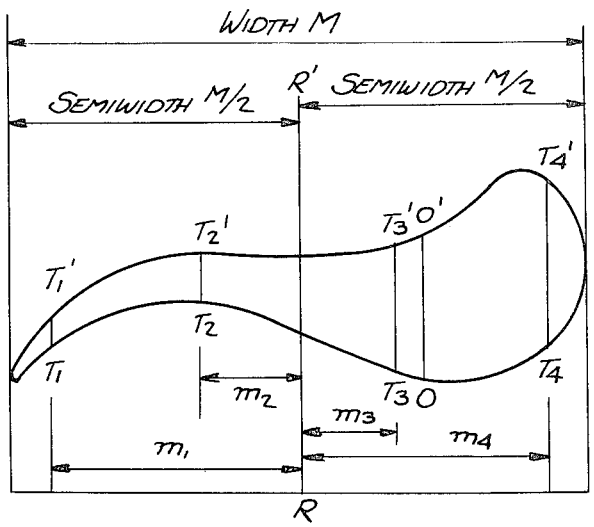
Fig. 2.
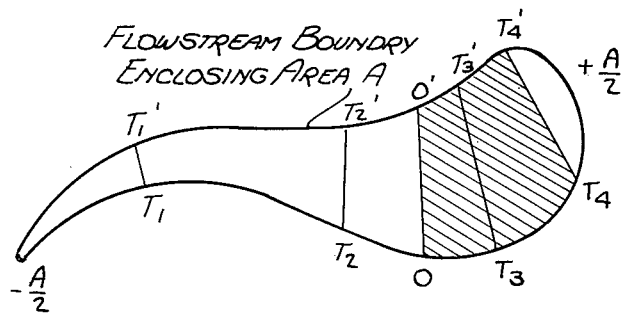
Fig. 3.
Fig. 4.
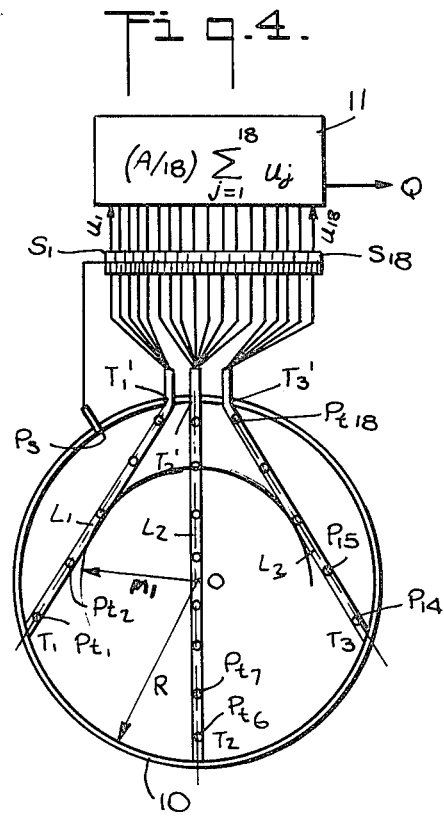
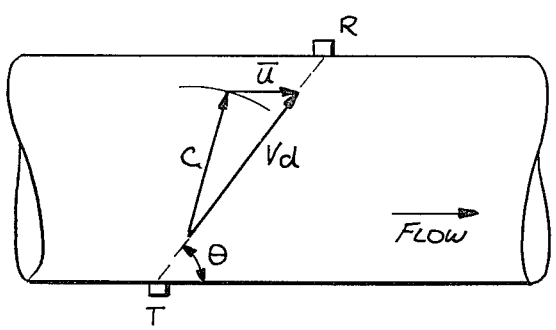
Fig. 5.

MULTIPLE VELOCITY TRAVERSE FLOW RATE MEASURING TECHNIQUE

BACKGROUND OF INVENTION

1. Field of Invention

This invention relates generally to fluid flow measurement, and more particularly to a method and systems based thereon for conducting a multiple velocity traverse of a flow stream cross section having a known shape and area in order to determine fluid flow therethrough.

2. Measurement Problem

The concern of the present invention is with the measurement of flow rate through a stream cross section of known but not restricted shape and having a known area A. The product of area A by a sample point velocity is generally unsatisfactory because of wide departures of local velocities from the area average. Traversing the area A with a movable point velocity sensor or with a line of many fixed point velocity sensors so as to obtain a single line average velocity $\bar{u}$ on a single traversing chord affords only a partial improvement. To further improve measurement accuracy, it is known to use a number n of traverse chords to yield line average velocities $\bar{u}_i$ modified by weight factors $w_i$ to reduce integrated flow uncertainty as n is increased.

Many methods of conducting multiple velocity traverses on a number n of chords traversing a flow stream cross section are available, some suitable in rivers or open channels presenting many stream cross section shapes, and some in circular pipes. Some are more suitable in gas flows at elevated Mach number, and others are more suitable in liquid or slurry flows.

The state of the art of multiple velocity traversing is such that any one of n traverse chord average velocities $u_i$ can often be determined with an uncertainty of a few hundredths of a percent, whereas integrated flowrate measurements of commensurate accuracy have been very costly. Even in case of the idealized analytical velocity profiles approximated in straight circular pipes and called axisymmetric, such as the curves of velocity versus radius shown in FIG. 1, the problem of employing an economically acceptable number n of traverses and at the same time maintaining a single calibration constant of acceptable accuracy has presented considerable difficulty.

In FIG. 1, curve 1 is the flat profile found occasionally in fibrous slurry flows or in the flows of gases and liquids for short distances after a faired contraction. Curve 2 is a representative turbulent profile, while curve 3 is the familiar parabolic profile of laminar flow found at low velocity or high viscosity. Curves 2 and 3 are found at pipe cross sections preceded by long straight lengths of pipe of uniform area and circular section. Curve 4 is the conical profile, convenient as a severe approximation of the peaked velocity profiles found downstream of gradual and sudden enlargements. The actual profiles are difficult to predict, but these examples permit some evaluation of the calibration stability to be expected of multi-traverse flow measurements which use various chord configurations and weight factors.

For specified accuracy, the required number n of traverses may be minimized if traverse line choices and weight factors are in accordance with the abscissas $x_i$ and weight factors $w_i$ of one of the well-known approximations known as numerical integration methods. These are found in mathematical references such as the U.S. Department of Commerce publication, National Bureau of Standards Applied Mathematics Series 55, "Handbook of Mathematical Functions" (hereinafter referred to as NBS Math series 55).

3. Prior Art

Malone et al. U.S. Pat. No. 3,564,912 discloses a multi-traverse measurement employing traverse chord locations which are appropriate to flow streams of unknown shape and area. A single arbitrary chord of width M is measured and bisected. The traverse chords having lengths $L_i$, all normal to the width chord M, are placed at fractional lengths $m_i$ from the bisector of M. Values $x_i$ are taken to be ratios of the fractional lengths $m_i$ to the semi-widths $\pm M/2$ so that $x_i = 2m_i/M$. Means are provided for measuring the product $u_i L_i$ for each of n traverse chords, modified by certain weight factors $w_i$ appropriate to the $x_i$ previously chosen and for computing an estimated volumetric flow rate Q from the following equation:

$$Q = \frac{M}{2} \sum_{i=1}^{n} \bar{u}_i L_i w_i \qquad (1)$$

Malone et al. choose values of $x_i$ and $w_i$ to correspond to the abscissas $x_i$ and weight factors $w_i$ provided by one of the well-known numerical integration methods, such as the Gaussian integration method, or alternately the Chebyshev or the Lobatto integration method, and so approximate the integration of the differential form $f(x)dx$, where $f(x)$ is the product $\bar{u}L$. When, however, this method is applied not to a stream cross section of unknown shape but rather to a shape which is known; that is, where L is a known function of x, the system accuracy suffers from the method which makes no provision for taking advantage of this knowledge.

For example, a system of Malone et al. employing n=3 chords traversing a circular pipe with Gaussian integration will experience calibration factors which vary by 5% over the extremes of axisymmetric profiles shown in FIG. 1. Attempts to use this three-traverse system in a long straight pipe in the transition range of Reynolds numbers of 2000 to about 4,000 where there are abrupt step changes of the velocity profile between curves 2 and 3, FIG. 1, will produce oscillations of the calibration factor of nearly 2%. In this application, the system of Malone et al. would require n=6 traverse chords to approach in flow measurement uncertainty the uncertainty of a few hundredths of one percent with which the individual traverse values $\bar{u}_i$ can be measured. Moreover, this system requires that traverse chords must be parallel, however inconvenient such an array of traverses may be.

The Wyler U.S. Pat. No. 3,940,985 discloses a method which partially reduces these deficiencies for circular pipes only. For such a pipe of radius R it is known that $L/R = 2\sqrt{1-(m/R)^2}$ for which Wyler avails himself of a numerical method for approximating the integration of the differential form $f(x)\sqrt{1-x^2}dx$, found in Section 25.4.40 on page 889 of the NBS Math Series 55. When Wyler employs n=3 traverse chords, calibration factors will vary by more than 3% when velocity profiles of FIG. 1 are encountered, while step changes and fluctuations of the calibration constant of about two-thirds of one percent will be found in the transition between laminar and turbulent flow in a long straight pipe. Moreover, the Wyler method is not applicable if the flow cross section is other than circular, and requires that the traverse chords be parallel.

Additional multi-traverse flow measurement systems include those disclosed in the Baker et al. U.S. Pat. No. 4,078,428, the Brown U.S. Pat. No. 4,102,186 and the Lynnworth U.S. Pat. No. 4,103,551. All these systems are limited to circular pipes. Moreover, all give equal weight to the various traverse chords. All place the n chords essentially at a mid-radius position, which is to say, tangent to a circle whose radius m is a specified fraction close to one-half of the pipe radius R, ranging from a low of 0.497R for one of Lynnworth's arrangements to a maximum of 0.6R for one of Brown's.

Thus, in all these cases, the advantage of using more than one traverse chord is limited to a partial tendency to average out the variations that a single mid-radius traverse chord would encounter in the event of some slight asymmetry of a relatively flat velocity profile such as the turbulent profile curve 2 of FIG. 1. When encountering the various axisymmetric profiles of FIG. 1, these essentially mid-radius chord position systems have calibration constants which are those of a single traverse using an off-center chord. The exact choice of chord position makes it possible to equalize the calibration constants for any two normal profiles expected in long pipes, but any such position is exceptionally vulnerable to a sharp profile, with typically an eight percent shift from a normal profile to the cone profile curve 4 of FIG. 1. Moreover, none of these systems is applicable to non-circular flow stream cross sections.

The above-identified prior art patents deal with ultrasonic or acoustic methods for effecting flow measurement. However, total flow may also be determined from point measurements of velocity by means of pitot tubes of the type commonly employed for measuring linear velocity (see Handbook of Fluid Dynamics—McGraw Hill, 1961, pp. 14-7 through 14-9), hot wire anemometers as well as propeller meters attached to the ends of a probe which allow positioning of the sensor along a chord within the flow stream. The use of ultrasonics to obtain the chord average velocity yields the value $\bar{u}$ directly; whereas in point sampling methods, $\bar{u}$ has to be calculated.

SUMMARY OF INVENTION

In view of the foregoing, the main object of my invention is to provide an improved method and systems based thereon for measuring flow rate through a stream cross section of known shape having a known area.

More particularly, an object of this invention is to provide a method and systems based thereon for conducting multiple traverse flow measurements of improved accuracy and reduced cost, which measurements are not significantly affected by the transition between laminar and turbulent flow, by fluid viscosity changes, or by upstream disturbances which give rise to abnormal velocity profiles.

A significant feature of the invention is that it makes possible fewer traverse chords than has heretofore been feasible for flow measurement uncertainties commensurate with the uncertainty in the line average velocity measured on a single chord.

Also an object of the invention is to provide a multi-traverse technique and system based thereon which employs one of the well-known methods of numerical integration to place the traverse chords and weight the chord average velocities, the technique being applicable to flow streams of any known cross-sectional shape and area without requiring that the traverse chords be in parallel relation.

Briefly stated, in a technique in accordance with the invention, volumetric flow rate Q of a fluid flowing in a stream of known cross section shape and area A is determined by measuring n line-average velocities $\bar{u}_i$ associated with n traverse chords in the cross section, where i designates a particular one of the chords. The area A is first bisected by any convenient reference chord, and the resulting semi-areas $\pm A/2$ are further partitioned by the said traverse chords into predetermined fractional areas $a_i$ contained within the flow cross section boundary between each of the traverse chords and the reference area-bisecting chord. The value $x_i$ denotes the ratios of the fractional areas $a_i$ to the semi-areas $\pm A/2$ so that $x_i = \pm 2A/A$ where positive and negative values denote fractional areas disposed on opposite sides of the reference chord.

The traverse chord average velocities $\bar{u}_i$ are measured and modified by predetermined weight factors $w_i$ appropriate to the $x_i$ previously chosen, and the ideal volumetric flowrate Q is computed from the following equation:

$$Q = \frac{A}{2} \sum_{i=1}^{n} \bar{u}_i w_i \qquad (2)$$

The predetermined values $x_{i\ l\ and\ wi}$ are chosen to correspond to the abscissas $x_i$ and weight factors $w_i$ provided by the Gaussian method or alternately the Chebyshev or Lobatto methods of numerical integration.

OUTLINE OF DRAWINGS

For a better understanding of the invention as well as other objects and further features thereof, reference is made to the following detailed description to be read in conjunction with the accompanying drawings, wherein:

FIG. 1 graphically illustrates various curves of velocity vs. radius in a straight circular pipe;

FIG. 2 shows the location of parallel traverse chords employed in a prior art arrangement;

FIG. 3 shows one set of traverse chords in accordance with the invention;

FIG. 4 shows an embodiment of a flow measuring system in accordance with the invention;

FIG. 5 illustrates the vector addition involved in an acoustic vector flowmeter;

Figure 8:
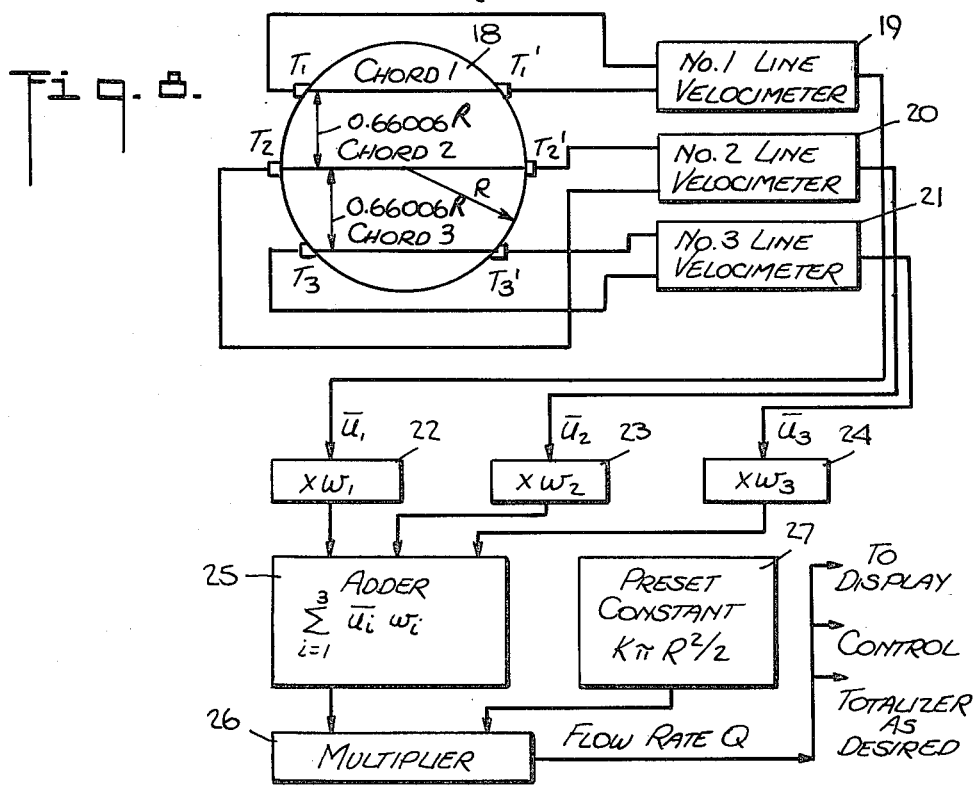

FIG. 8 schematically illustrates a preferred embodiment of the invention.

DETAILED DESCRIPTION

The invention can best be understood by contrast with a prior, well-known method of applying Gaussian integration to determine volumetric flowrate through a flow stream cross section of irregular and arbitrary boundary shape represented by the identical closed curves of FIGS. 2 and 3 by means of an arbitrarily chosen n=4 traverse chords $T_1$-$T'_1$, $T_2$-$T'_2$, $T_3$-$T'_3$, and $T_4$-$T'_4$.

FIG. 2 shows the well-known locations of parallel traverse chords employed in the prior art, where Gaussian integration is used to approximate the integral $$Q = \int_{-M/2}^{+M/2} \bar{u} L \, dm$$

by the summation according to Equation (1). In this case, the distances $m_i$ are chosen to be fractions $x_i$ of the semi-widths M/2.

If the shape of the stream boundary shown by heavy closed curve were unknown, and only a single width M, bisected by the perpendicular bisector reference line R-R' and the lengths $L_i$ of the chords $T_i$-$T_i'$ were accessible, this arrangement would yield a best estimate of the total flow through the cross section. However, by constructing the chord O-O' which bisects the area, it can be seen that three out of four traverses of FIG. 2 are devoted to the left half of the area, while only one traverse is devoted to the right half, a degree of imbalance in the sampling of this arbitrary shape which leads to a very crude flow estimate unless a much larger number than n=4 traverses is employed.

FIG. 3 shows one set of traverse chords according to my invention, but again using n=four traverses on chords $T_i$-$T_i'$ for i=1, 2, 3 and 4, and again employing Gaussian integration. According to my invention, a preliminary determination is made of the shape of the entire boundary of the stream cross section, and the area A enclosed by the boundary curve is determined by planimetric or graphical or analytical methods.

According to my invention, the numerical integration is to be employed to approximate the flow equation $$Q = \int_{-A/2}^{+A/2} \bar{u} \, da$$

by a summation according to Equation (2). Rather than choosing distance fractions to correspond to the $x_i$, I choose areas $a_i$. Thus, for example, resorting to planimetric or graphical or analytical method as may be appropriate, I place the fourth chord $T_4$-$T'_4$ so that the area $a_4$ which is shown shaded on FIG. 3 as the area between the area-bisecting reference chord O-O' and the traverse chord $T_4$-$T'_4$, with $a_4$ taken to be the fraction $x_4 = 0.86114$ of the semi area A/2.

The following table for Gaussian Integration gives values of abscissas $x_i$, here interpreted according to my invention to be equal to $2a_i/A$, the weight factors $W_i$ for n=3 or 4 or 5 (i.e., for three or four or five traverse chords) as transcribed from page 916 of the NBS Math Series 55 and rounded off to five significant digits:

| TABLE FOR GAUSSIAN INTEGRATION | | | |
|---|---|---|---|
| Three | i = 1 | $x_1 = -0.77460$ | $w_1 = 0.55556$ |
| traverses | i = 2 | $x_2 = 0.00000$ | $w_2 = 0.88888$ |
| n = 3 | i = 3 | $x_3 = +0.77460$ | $w_3 = 0.55556$ |
| Four | i = 1 | $x_1 = -0.86114$ | $w_1 = 0.34785$ |
| traverses | i = 2 | $x_2 = -0.33998$ | $w_2 = 0.65215$ |
| n = 4 | i = 3 | $x_3 = +0.33998$ | $w_3 = 0.65215$ |
| | i = 4 | $x_4 = +0.86114$ | $w_4 = 0.34785$ |
| Five | i = 1 | $x_1 = -0.90618$ | $w_1 = 0.23693$ |
| traverses | i = 2 | $x_2 = -0.53847$ | $w_2 = 0.47863$ |
| n = 5 | i = 3 | $x_3 = 0.00000$ | $w_3 = 0.56888$ |
| | i = 4 | $x_4 = +0.53847$ | $w_4 = 0.47863$ |
| | i = 5 | $x_5 = +0.90618$ | $w_5 = 0.23693$ |

Additional abscissas and weight factors for Gaussian integration for n=6 or more may be found in the NBS Math Series 55 on pages 916 through 919. While Gaussian integration is preferred for most common and simple shapes of flow stream cross section, I may prefer to employ Chebyshev integration, or alternately Lobatto integration, in very unusual circumstances of flow stream cross section shape and velocity distribution. In either such case, the tabulated values of $x_i$ are again not to be interpreted as length fractions as in the prior art, but rather according to my invention as the aforesaid area fractions, $x_i=2a_i/A$. Tables of values of $x_i$ and $w_i$ for both Chebyshev integration and Lobatto integration will be found in the NBS Math Series 55 on page 920.

Those skilled in the art of multi-traverse flow measurement can recognize the qualitative advantage of the method of traverse chord location according to my invention as portrayed in FIG. 3 and contrasted with the method of the prior art shown in FIG. 2, for the case of a flow stream of arbitrary but known shape and area. The application of my method to the measurement of volumetric flow rate in a circular pipe also has great advantages over the prior art, as may be demonstrated analytically. I generally prefer to employ the Gaussian integration tables for this purpose, and it is convenient to prepare tables of the dimensionless ratios $m_i/R$, where m is the perpendicular distance from pipe center to traverse chord and R is the radius of the internal surface of the pipe wall. Since according to my invention $x_i=2a_i/A$, the $x_i$ tabulated above are related to $m_i/R$, by the equation derived from the geometry and trigonometry of the segments of circles, as follows:

$$\pm x_i = 1 - \frac{2}{\pi} \left[ \arctan \sqrt{\left(\frac{R}{m_i}\right)^2 - 1} - \frac{|m_i|}{R} \sqrt{1 - \left(\frac{m_i}{R}\right)^2} \right] \quad (3)$$

For example, when three chords are to be traversed, so that n=3, the desired area fraction to be partitioned by an area bisector and chord number 3 is $2a_3/A = x_3 = 0.77460$ as given in the Table for Gaussian Integration. By trial and error using Equation (3), I find that the value $m_3/R = 0.66006$ will locate the third chord so as to give this area fraction $x_3 = 0.77460$. The length $L_i$ of such a chord may be expressed as a dimensionless ratio $L_i/D$ where D is the pipe diameter, and $L_i/D$ is next found from $$L_i/D = \sqrt{1 - (m_i/R)^2} \quad (4)$$

Thus, $L_3D$ for the same third chord for which $m_3/R = 0.66006$ is found from Equation (4) to be $L_3/D = 0.75121$. Moreover, the weight factor $w_3$ which I use to modify the third traverse chord average velocity $\bar{u}_3$ is found in the Table for Gaussian Integration to be $w_3 = 0.55556$. Proceeding in this fashion, design tables for traverse chords to be positioned in circular pipes according to my invention may be prepared for any desired number n of traverse chords. For example, when n=3 or 4 or 5, and Gaussian integration is to be applied to flow streams of circular cross section, the following Table for Gaussian Method in Circular Pipes gives the needed information to comply with my invention.

| TABLE FOR GAUSSIAN METHOD IN CIRCULAR PIPES | | | | |
| --- | --- | --- | --- | --- |
| Three      | $i=1$ | $m_1/R = -0.66006$ | $L_1/D = 0.75121$ | $w_1 = 0.55556$ |
| traverses  | $i=2$ | $m_2/R = 0.00000$  | $L_2/D = 1.00000$ | $w_2 = 0.88888$ |
| $n=3$      | $i=3$ | $m_3/R = +0.66006$ | $L_3/D = 0.75121$ | $w_3 = 0.55556$ |
| Four       | $i=1$ | $m_1/R = -0.75649$ | $L_1/D = 0.65401$ | $w_1 = 0.34785$ |
| traverses  | $i=2$ | $m_2/R = -0.27035$ | $L_2/D = 0.96276$ | $w_2 = 0.65215$ |
| $n=4$      | $i=3$ | $m_3/R = +0.27035$ | $L_3/D = 0.96276$ | $w_3 = 0.65215$ |
|            | $i=4$ | $m_4/R = +0.75649$ | $L_4/D = 0.65401$ | $w_4 = 0.34785$ |
| Five       | $i=1$ | $m_1/R = -0.81365$ | $L_1/D = 0.33797$ | $w_1 = 0.23693$ |
| traverses  | $i=2$ | $m_2/R = -0.43728$ | $L_2/D = 0.89933$ | $w_2 = 0.47863$ |
| $n=5$      | $i=3$ | $m_3/R = 0.00000$  | $L_3/D = 1.00000$ | $w_3 = 0.56888$ |
|            | $i=4$ | $m_4/R = +0.43728$ | $L_4/D = 0.89933$ | $w_4 = 0.47863$ |
|            | $i=5$ | $m_5/R = +0.81365$ | $L_5/D = 0.33797$ | $w_5 = 0.23693$ |

Using only three traverse chords positioned as shown in Table for Gaussian Method in Circular Pipes for $n=3$, my invention incurs only a 2.3% variation in the calibration factor when encountering all of the extremes of velocity profile of FIG. 1, while the step change and oscillations encountered in the transition from laminar to turbulent flow are reduced to 0.04%, which is commensurate with the additional uncertainty in determination of line averages $\bar{u}_i$ themselves.

It is not necessary that the traverse chords be parallel. FIG. 4 shows an embodiment of my invention which is equally adaptable to the measurement of water in a large circular aqueduct 10 or to waste gas rising in a circular flue, of radius R. A static pressure opening $P_s$ in the wall of circular conveyence 10 communicates with the low pressure connections of a set $S_1$-$S_{18}$ of eighteen square-rooting differential pressure devices. A set of eighteen impact pressure openings $P_{t1}$, $P_{t2}$, ------, $P_{t18}$ face upstream into the oncoming fluid and are connected to the high pressure connections of the devices $S_1$-$S_{18}$ whose outputs correspond to $u_1$, $u_2$, ------, $u_{18}$ eighteen point values of velocity. Three structural members are disposed along $n=3$ traverse chords $L_1$, $L_2$ and $L_3$. Of these, $L_1$ and $L_3$ corresponding to $i=1$ and $i=3$, Table for Gaussian Method in Circular pipes, are tangent to an arc of radius $m_1 = m_3 = 0.66006R$, while $L_2$ passes through the duct center at $m_2/R = 0$. The line average velocities may be found as the averages respectively of five point velocities distributed along chord $L_1$, eight along $L_2$ and five along $L_3$, each group of openings being spaced along each chord by whatever spacing scheme shall seem best suited to available knowledge of the fluid mechanics of long-pipe flow.

For example, certain spacings at fractions of the chord length $L_i$ corresponding to the equal weight Chebyshev integration would permit equal weighting of all velocities on each chord to yield line average velocities.

$$\bar{u}_1 = 1/5 \sum_{j=1}^{5} u_j$$

$$\bar{u}_2 = \tfrac{1}{8} \sum_{j=6}^{13} u_j$$

$$\bar{u}_3 = 1/5 \sum_{j=14}^{18} u_j$$

where j denotes a particular one of the impact pressure positions.

The particular choice of equal weight openings of quantity 5, 8, and 5 (or alternately a multiple of these such as 10, 16, and 10 etc.) is helpful in facilitating the Gaussian integration with the weight factors from the Table, $w_1 = w_3 = 0.55556 = 5/9$ and $w_2 = 0.88888 = 8/9$ according to Equation (2), $$Q = \frac{\pi R^2}{2} \left[ \frac{5\bar{u}_1}{9} + \frac{8\bar{u}_2}{9} + \frac{5\bar{u}_3}{9} \right] \tag{2a}$$

which on substituting the values for $\bar{u}_1$, $\bar{u}_2$ and $\bar{u}_3$ becomes:

$$Q = \frac{\pi R^2}{18} \sum_{j=1}^{18} u_j \tag{2b}$$

Thus in the case of $n=3$ traverse chords, the distribution of numbers of velocity measuring points along the chord in proportion to the respective weighting factors for Gaussian integration permits the use of the data processor 11 of FIG. 4 to compute the simple average and multiply by the flow area $A = \pi R^2$ to yield the desired flow rate Q according to Equation (2b).

It will be apparent that I may replace the many impact pressure openings of FIG. 4 with a single impact opening mounted on a slidable and hinged structure so as to successively traverse the chords $L_1$, $L_2$ and $L_3$ so as to obtain line averages $u_1$, $u_2$ and $u_3$ which are delivered as signals to an alternate data processor programmed to yield an output flow measurement Q in accordance with Equation (2a). I may, moreover, in the sensing of point velocity $u_j$, replace the square-root of a differential pressure with an alternate small propeller known as a current meter or rotating anemometer whereby the point velocity $u_j$ is indicated by a frequency signal, again with either a plurality of such current meters disposed as at the points $P_{t1}$, $P_{t2}$, ------, $P_{t18}$ along the chords $L_1$, $L_2$ and $L_3$ of FIG. 4 and a data processor according to Equation (2b), or with a single current meter mounted to traverse successively the chords $L_1$, $L_2$ and $L_3$ to yield line averages $\bar{u}_1$, $\bar{u}_2$ and $\bar{u}_3$ for use in computing Q according to Equation (2a).

Alternately, I may employ one or several hot-wire or hot-film anemometers for point velocity sensing. Or, if an optically or acoustically transparent window is provided in one side of the duct, I may mount the assembled components of a laser doppler velocimeter or an acoustic doppler velocimeter whose focal point is the position of point velocity sensing; and by moving the components external to the pipe, effect the motion within the pipe of the velocity sensing focal point either continuously along the chords to generate line average $\bar{u}_1$, $\bar{u}_2$ and $\bar{u}_3$ or successively to selected eighteen points so that again either Equation (2a) or (2b) could be programmed into a digital processor to yield Q.

Still other embodiments may measure the chord average velocities $\bar{u}_i$ directly. Thus, a very rapid velocity traverse may be made by observing the velocity vector V of an acoustic pulse which in general will represent the sum of two vectors, one the velocity of sound C in the fluid at rest, and the other the desired traverse chord average flow velocity $\bar{u}$.

It has been taught erroneously by many inventors and others that the velocity $V_d$ of an acoustic ray between transmitter and receiver making an angle $\theta$ with the general flow direction is the algebraic sum of the sound velocity C and the ray-directed component $\bar{u}\cos\theta$ of the traverse chord average velocity. This leads to the absurdity that a particular ray which is normal to the general flow direction is unaffected by the flow since $\cos(\pi/2)=0$. As a matter of fact, numerous acoustic vector flowmeters have been demonstrated in which either a thin beam direction change or a change in the magnitude of the vector sum velocity $V_d$ along the fixed direction $\theta=\pi/2$ has been observed.

The correct vector addition is as shown in FIG. 5 and is expressed mathematically by the trigonometric equation for any plane triangle. Solved explicitly for the resultant acoustic signal velocity $V_d$ along the $\theta$ direction between acoustic transmitter T and receiver R, this leads to the equation:

$$V_d = \sqrt{C^2 - \bar{u}^2 + \bar{u}^2 \cos^2\theta} + \bar{u}\cos\theta \tag{5}$$

In this correct form, it is apparent that $V_d$ is affected by variations in u even when $\cos\theta=0$, and the use of an acoustic vector on a transmitter-receiver line normal to the general flow direction in a wind tunnel has been experimentally demonstrated for measurement of a traverse chord average velocity by David et al., "An Experimental Investigation of an Acoustic Method for Measuring Gas Mass Flow," Arnold Engineering Development Center Report No. AEDC-TR-73-140, September 1973, wherein a stagnation value $C_t$ of the velocity of sound in air in the wind tunnel was computed using tunnel stagnation temperature measurements. Line average velocities $\bar{u}$ in the so-called compressible flow range of Mach numbers of 0.26 to 0.6 were covered by this method, and $\bar{u}$ calculated from Equation (5) when $\cos\theta=0$, solved for $$\bar{u} = \sqrt{C^2 - V_d^2}$$

which thermodynamically expressed in terms of $C_t$ and the isentropic exponent k of the gas became $$\bar{u} = \sqrt{\frac{2}{k+1}(C_t^2 - V_d^2)} \tag{6}$$

The ray velocity $V_d$ was found from the known chord length between transmitter and receiver and the observed travel time. The use of the non-oblique ray was successful.

Another velocity traverse method employs an acoustic transmitter to project a thin pencil beam of acoustic energy which, when there is no flow, is directed on a chord parallel to a duct cross section, and is received equally by two adjacent receivers axially disposed opposite the transmitter. In the presence of flow, the line average flow velocity vector $\bar{u}$ combines with the C vector so that the summed resultant vector is deflected, the downstream receiver receiving a greater energy fraction, and the upstream receiver less. This method has been employed when the departure of the magnitude of $V_d^2$ from that of $C^2$, Equation (6), is too small to sense without unacceptable uncertainty, when $\theta$ is close to $\pi/2$.

Figure 6:
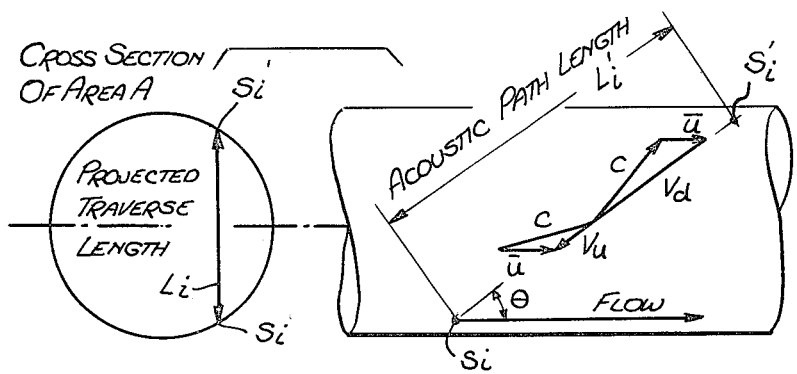
FIG. 6 illustrates an acoustic transducer for line traversing.

Numerous other acoustic line traversing methods are known, and among the most accurate are those employing transducers such as $S_i$ and $S_i'$ in FIG. 6. Each transducer is capable of acting as a transmitter as well as a receiver of acoustic energy, and the line $L_i'$ connecting $S_i$ and $S_i'$ is oblique with respect to both the desired traverse chord $L_i$ in the flow cross section of area A and to the general flow direction. If we restrict the meaning of $\theta$ to the acute angle between the line $S_i$-$S_i'$ and the flow direction, the velocity $V_d$ of a downstream ray along the acoustic path connecting $S_i$ and $S_i'$ will be as given in Equation (5), while that of an upstream ray $V_u$ also along the line connecting the transducers will be found from trigonometry to be $$V_u = \sqrt{C^2 - \bar{u}^2 + \bar{u}^2 \cos^2\theta} - \bar{u}\cos\theta \tag{7}$$

By subtracting (7) from (5) and solving for $\bar{u}$ there results $$\bar{u} = \frac{V_d - V_u}{2\cos\theta} \tag{8}$$

Since $V_d = L_i'/T_d$ and $V_u = L_i'/T_u$ where $T_d$ and $T_u$ denote the respective observed travel times of acoustic energy downstream from $S_i$ to $S_i'$ and upstream from $S_i'$ to $S_i$, while $L_i'$ denotes the length of the oblique path through the fluid between $S_i$ and $S_i'$, which in turn is equal to the length L of the desired traverse chord divided by $\sin\theta$, all these substitutions may be made in Equation (8) to yield:

$$\bar{u} = \frac{L_i(T_u - T_d)}{2T_u T_d \sin\theta \cos\theta} \tag{9}$$

Figure 7:
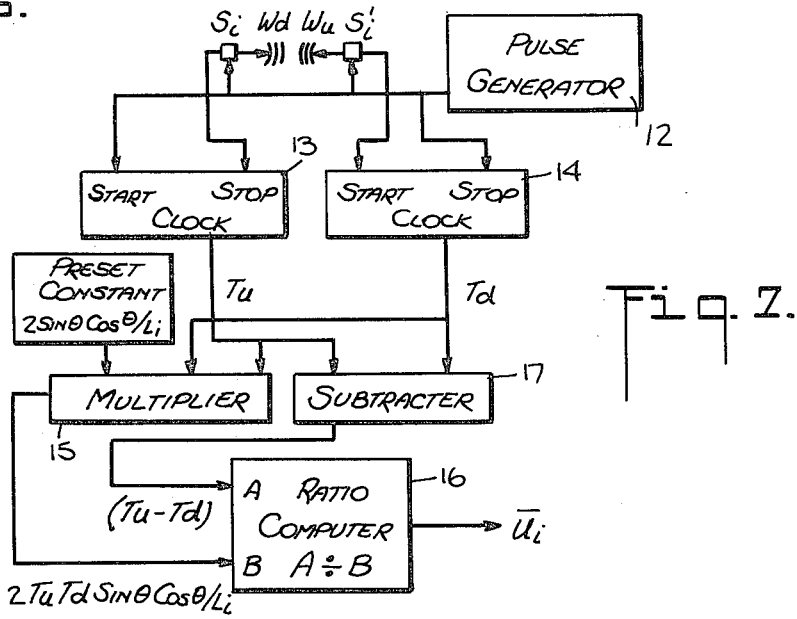
FIG. 7 shows an acoustic line average velocity meter.

The measurement of a single traverse line average velocity $\bar{u}$ by means of opposed acoustic transmission and a data processing system employing either Equation (8) or Equation (9) is readily accomplished. For example, an acoustic line average velocity meter is shown in FIG. 7. In FIG. 7, an electrical pulse generator 12 energizes acoustic transducers $S_i$ and $S_i'$ and starts clocks 13 and 14 simultaneously at time zero.

The upstream acoustic wave $w_u$ and the downstream wave $w_d$ result, representing energy which transducers $S_i'$ and $S_i$ respectively propagate toward each other on a fluid path $S_i$-$S_i'$ such as that of FIG. 6. On traversing the distance $L_i'$ of FIG. 6, acoustic waves act on the transducers to generate electric pulses to stop the clocks, providing clock outputs $T_u$ representing acoustic propagation time in the upstream direction and $T_d$ representing that in the downstream direction. The signals indicative of $T_u$ and $T_d$, together with a signal indicative of a preset constant (equal to $2\sin\theta\cos\theta/L_i$ where $\theta$ is the acute angle shown in FIG. 6 and $L_i$ is the length of the traverse chord over which the chord average velocity $\bar{u}_i$ is desired), are delivered to a multiplier 15 whose product output $2T_u T_d \sin\theta\cos\theta/L_i$ is delivered to the denominator input terminal B of a ratio computer 16.

Additionally, the signals representing $T_u$ and $T_d$ are entered into a subtractor 17 whose difference output ($T_u$-$T_d$) is delivered to the numerator input terminal of ratio computer 16. The A÷B ratio computer has an output which is seen to be the right side of Equation (9) and is therefore representative of the single line-average velocity $\bar{u}_i$ to be measured by each of n line-average velocimeters according to my invention, wherein the desired n traverse chords are positioned as hereinbefore disclosed.

The detailed circuitry necessary to perform the indicated functions of the line velocimeter of FIG. 7 are well known in the art of acoustic flow sensing. Equally well known is any of many acoustic line velocimeters employing data processing circuitry to perform a computation of a single velocity $\bar{u}_i$ according to other equations including Eq. (8).

FIG. 8 shows a preferred embodiment of my invention for the measurement of viscous liquids employing n=3 line velocimeters which may be of the type shown in FIG. 7 or other known type hereinbefore described. Three opposed transducer pairs $T_i$-$T_i'$ with i=1,2,3, define, by projection of the lines connecting them onto the cross section view shown, the traverse chord 1, chord 2, and chord 3.

According to the Table for Gaussian Method in Circular Pipes with n=3, chord 2 is placed at m/R=0.00000 or on a diameter passing through the center of the pipe 18 of radius R, while chord 1 and chord 3, in this case shown parallel to chord 2, are separated from it and hence from the center of the pipe by ±0.66006R. Indications of three chord-average velocities $\bar{u}_1$, $\bar{u}_2$ and $\bar{u}_3$ are obtained from said three line velocimeters 19, 20 and 21 associated respectively with said three transducer pairs, and are modified, respectively, by three multipliers 22, 23 and 24, respectively, preset for the weight factors $w_1$, $w_2$ and $w_3$.

These modified signals are delivered to an adder 24 whose sum output signal indicative of the relationship $$\sum_{i=1}^{3} \bar{u}_i w_i$$

is delivered to a multiplier 26. In addition a preset constant signal from source 27 appropriate to half of the pipe area $\pi R^2/2$ and including a calibration factor or flow coefficient K, is also delivered to multiplier 26 whose output is then seen to be the product of the ideal flowrate implied by the computation shown in Equation (2) and said flow coefficient.

While there have been shown and described preferred embodiments of a multiple velocity traverse flow rate measuring technique in accordance with the invention, it will be appreciated that many changes and modifications may be made therein without, however, departing from the essential spirit thereof.

I claim:

1. A system for measuring volumetric flowrate through a stream cross section of known shape and Area A comprising:
   (a) means for measuring line-average velocity $\bar{u}_i$ on a plurality of n chords traversing said cross section so as to partition said area into predetermined fractional areas $a_i$; said chords being positioned so as to partition said Area A into predetermined fractional areas $a_i$ as measured within said cross section between a reference line bisecting the Area A and each of said chords, the predetermined fractional areas being chosen to be predetermined fractions $x_i$ of the semi-areas A/2; said predetermined area fractions $x_i$ and weight factors $w_i$ being chosen to be equal to the abscissas $x_i$ and weight factors $w_i$ of one of the following methods of numerical integration:
   (i) Gaussian Integration
   (ii) Chebyshev Integration
   (iii) Lobatto Integration
   (b) data processing means coupled to said measuring means and yielding volumetric flowrate Q according to the computation $$Q = (A/2) \sum_{i=1}^{n} \bar{u}_i w_i$$

2. A system according to claim 1, wherein said means for measuring line average velocity $u_i$ includes point velocity measuring means.

3. A system according to claim 2, wherein said point velocity measuring means includes means for measuring the difference between a stagnation pressure and a static pressure.

4. A system according to claim 2, wherein said point velocity measuring means includes propeller type current meter means for liquid velocity sensing.

5. A system according to claim 2, wherein said point velocity measuring means includes rotating type anemometer means for gas velocity sensing.

6. A system according to claim 2, wherein said point velocity sensing means includes thermal type hot-wire or hot-film means.

7. A system according to claim 2, wherein said point velocity sensing means includes doppler velocimeter means.

8. A system according to claim 2, wherein said point velocity sensing means includes acoustic doppler velocimeter means.

9. A system according to claim 1, wherein said means for measuring line average velocity $\bar{u}_i$ includes means for detecting vector variations in velocity of an acoustic ray caused by addition of the vector $\bar{u}$.

10. A system according to claim 9, wherein said means for detecting vector variations comprises means for detecting the angular magnitude of an acoustic beam deflection caused by the vector $u_i$.

11. A system according to claim 9, wherein said means for detecting vector variations comprises means for detecting changes in acoustic propagation velocity magnitudes caused by the vector $\bar{u}_i$.

* * * * *